US012444299B2

United States Patent
Kaufman et al.

(10) Patent No.: US 12,444,299 B2
(45) Date of Patent: Oct. 14, 2025

(54) IN-CAR DETECTION OF TRAFFIC CONTROL DEVICES AND METHODS THEREOF

(71) Applicant: Voice Products, LLC, Beachwood, OH (US)

(72) Inventors: Michael G. Kaufman, Beechwood, OH (US); Kevin Weekly, Lafayette, CA (US)

(73) Assignee: Voice Products, LLC, Beachwood, OH (US)

( * ) Notice: Subject to any disclaimer, the term of this patent is extended or adjusted under 35 U.S.C. 154(b) by 0 days.

(21) Appl. No.: 18/676,703

(22) Filed: May 29, 2024

(65) Prior Publication Data

US 2024/0404398 A1 Dec. 5, 2024

Related U.S. Application Data

(60) Provisional application No. 63/469,561, filed on May 30, 2023.

(51) Int. Cl.
*H04W 4/44* (2018.01)
*G08G 1/042* (2006.01)

(52) U.S. Cl.
CPC .............. *G08G 1/042* (2013.01); *H04W 4/44* (2018.02)

(58) Field of Classification Search
None
See application file for complete search history.

(56) References Cited

U.S. PATENT DOCUMENTS

| 4,968,979 | A  | * | 11/1990 | Mizuno | G08G 1/042 340/941 |
| 8,179,282 | B1 | * | 5/2012  | MacCarley | G08G 1/042 701/119 |
| 11,604,476 | B1 | * | 3/2023 | Leefer | H04L 67/12 |
| 2006/0091998 | A1 | * | 5/2006 | Fitzgibbon | E05F 15/77 340/5.71 |
| 2015/0070164 | A1 | * | 3/2015 | Schalk | A01M 29/00 340/539.1 |
| 2018/0350234 | A1 |   | 12/2018 | Myers et al. | |

(Continued)

FOREIGN PATENT DOCUMENTS

DE 102019109563 A1 10/2020

OTHER PUBLICATIONS

Li, Zhiguo; Key Techniques for Traffic Information Acquisition Sensor Networks; University of Technology Sydney Doctorate Thesis; Aug. 2019; retrieved from https://opus.lib.uts.edu.au/bitstream/10453/140563/2/02whole.pdf; 125 pages.

(Continued)

*Primary Examiner* — John F Mortell
(74) *Attorney, Agent, or Firm* — Frost Brown Todd LLP

(57) ABSTRACT

Traffic sensor detecting systems are provided for detecting the presence and location of traffic sensors (i.e., embedded induction loop coils) and communicating this information to the driver of a vehicle. The traffic sensor detecting systems can provide navigational information to assist with positioning the vehicle into a proper position over an induction loop coil so that a traffic light controller can be activated, a gate controller can be activated, or other process associated with the embedded induction loop coil can be triggered.

20 Claims, 6 Drawing Sheets

(56) References Cited

U.S. PATENT DOCUMENTS

| | | | |
|---|---|---|---|
| 2019/0157897 A1* | 5/2019 | Bollinger | ................ H02J 50/12 |
| 2020/0088902 A1 | 3/2020 | Yamamoto et al. | |
| 2021/0221359 A1 | 7/2021 | Yamamoto et al. | |
| 2021/0309181 A1* | 10/2021 | Kale | .................... G06V 40/172 |
| 2022/0057807 A1* | 2/2022 | Yamada | ............... G05D 1/0261 |
| 2022/0116079 A1* | 4/2022 | Zhou | .................... B60W 10/20 |

OTHER PUBLICATIONS

Rodriquez, Kari; International Search Report and Written Opinion of the International Searching Authority; Int'l. Pat. App. No. PCT/US2024/031355; Oct. 18, 2024; 13 pages.

\* cited by examiner

IN-CAR DETECTION OF TRAFFIC CONTROL DEVICES AND METHODS THEREOF

CROSS-REFERENCE TO RELATED APPLICATIONS

This application claims the benefit of U.S. Ser. No. 63/469,561, filed on May 30, 2023, the disclosure of which is incorporated herein by reference in its entirety.

BACKGROUND

Many traffic control devices require detection of vehicles on the road surface for the purpose of triggering traffic light changes, opening gates, or counting number of vehicles for traffic estimation. A ubiquitous approach for vehicle detection is an induction loop coil. Such induction loop coils, sometimes referred to as "traffic sensors," can be embedded into a road surface and used to detect the presence of a vehicle. Generally, such traffic sensors are coils of wire that detect changes in inductance based on the presence of a vehicle proximate to the coils of wire, which can be conveyed to sensor circuitry to produce signals. These induction loop coils rely on the fact that a vehicle frame is largely conductive (i.e., steel) and therefore will respond to and modify changing magnetic fields in the vicinity.

BRIEF DESCRIPTION OF THE DRAWINGS

The present disclosure will be more readily understood from a detailed description of some example embodiments taken in conjunction with the following figures.

DETAILED DESCRIPTION

Figure 1:
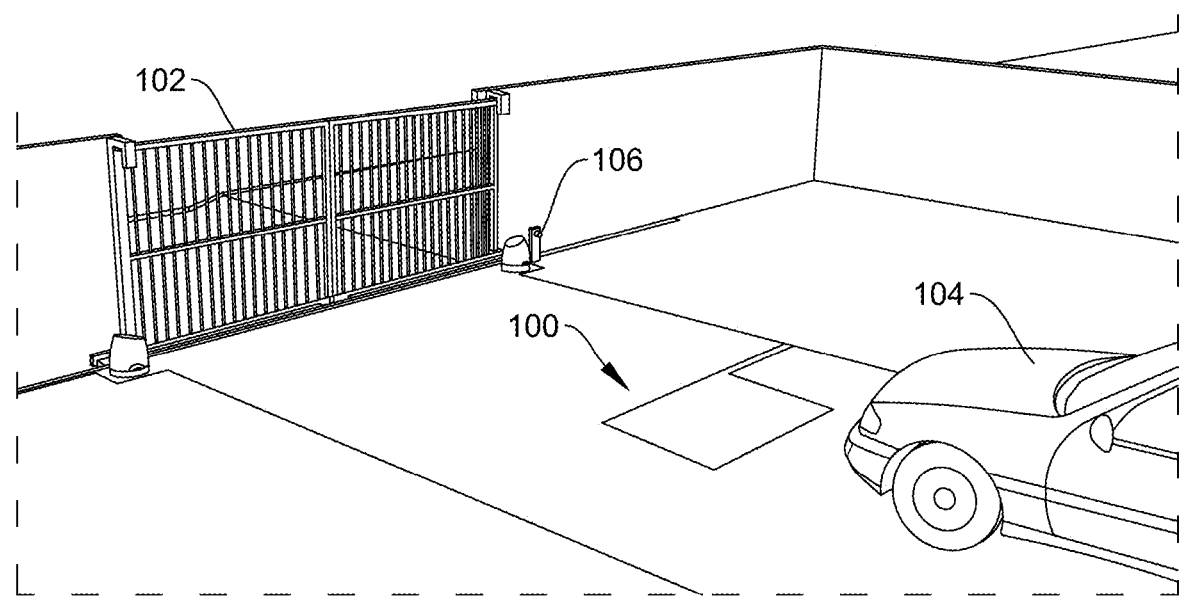
FIG. 1 depicts an example traffic sensor embedded in a driveway near a gate.

Various non-limiting embodiments of the present disclosure will now be described to provide an overall understanding of the principles of the structure, function, and use of the systems, apparatuses, devices, and methods disclosed. One or more examples of these non-limiting embodiments are illustrated in the accompanying figures. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that, although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

Induction loop traffic sensors, such as the traffic sensor 100 depicted in FIG. 1, are commonly embedded in driveways, roadways, and other traffic-related infrastructure to automatically control various systems, including gates, traffic lights, and other devices. In the example shown in FIG. 1, the traffic sensor 100 is installed in a driveway near a gate 102. When a vehicle 104 passes over the sensor, which is shown as a wire loop embedded in the roadway, a control system 106 associated with the traffic sensor 100 detects the change in the inductance caused by the vehicle's presence. This triggers the control system 106 to automatically open the gate 102, allowing the vehicle to pass through without the need for manual intervention.

However, referring to the operational example illustrated in FIG. 1, the positioning of the traffic sensor 100 may not be apparent to drivers approaching the gate 102, as the traffic sensor 100 is hidden beneath the surface of the driveway or roadway. Consequently, drivers might not be aware of the exact location or even the presence of the sensor. This lack of awareness can lead to situations where the driver fails to correctly position the vehicle 104 over the sensor, preventing the gate 102 from opening as intended. Such incidents can cause frustration for the driver and any other drivers who may be waiting behind them, as the gate will not open until the vehicle is positioned correctly.

Moreover, while the example shown in FIG. 1 illustrates the use of a traffic sensor for gate control, similar types of sensors are employed in various other traffic-related applications. For instance, traffic sensors are commonly used to manage traffic light systems, ensuring efficient traffic flow and minimizing congestion through intersections. The traffic sensors embedded in the roadway proximate to an intersection can detect the presence of vehicles and adjust the timing of traffic lights accordingly. As with the gate control example, however, drivers may be unaware of the precise location and function of these embedded traffic sensors. This lack of awareness can sometimes lead to confusion, frustration, or inefficiencies in traffic management. For example, if a car is pulled up too far, past the traffic loop it could wait forever because the light may never change. This might result in the driver giving up and crossing the intersection on the red light, putting themselves and the cross traffic at risk of a collision. Additionally, if a car is not pulled up far enough to trigger the traffic loop the car, that driver and drivers in the traffic behind them may become frustrated because the red light never will change until the first car moves up to activate the traffic control device.

The systems, apparatuses, devices, and methods disclosed herein relate to detecting the presence and location of traffic sensors (i.e., embedded induction loop coils) and communicating this information to the driver of a vehicle. Accordingly, example traffic sensor detecting systems described herein can provide information to assist a driver with moving their vehicle into a proper position over an induction loop coil so that a traffic light controller can be activated, a gate controller can be activated, or other process associated with the embedded induction loop coil can be activated. In some example embodiments, traffic sensor detecting systems described herein can also assist drivers in navigating their vehicle to a particular optimal location relative to the induction loop coil, such as centered over the loop, from which to trigger an induction loop sensor. In some example embodiments, traffic sensor detecting systems in accordance with the present disclosure can be utilized by autonomous vehicles. More specifically, a traffic sensor detecting system coupled to an autonomous vehicle can provide information to a drive control system of an autonomous vehicle to assist with the navigation of the vehicle into a proper position relative to a detected traffic sensor.

Some types of induction-based traffic sensor, such as traffic sensor 100, utilizes a driver circuit and a sense coil that is embedded in a roadway. The driver circuit contains a capacitor that when coupled with the inductance of the sense coil, forms an LC resonant circuit. The driver circuit drives the LC system at its resonant frequency (typically 20-120 KHz depending on loop geometry) and monitors changes in that frequency. When there is no vehicle above the sense coil, it will have a certain inductance, and when a large ferromagnetic object, like the vehicle 104, is positioned above the coil, the coil's inductance will increase significantly. The increase of inductance causes the LC system resonant frequency to drop from its baseline value. The driver circuit typically employs either a digital or analog detection mechanism to detect this frequency drop and, in turn, provide a signal to a traffic control system (such as a gate controller, traffic light timing system, etc.) indicating that a vehicle was detected. Traffic sensor detecting systems in accordance with the present disclosure generally rely, in part, on measuring the changing magnetic field emanating from the sense coil to determine whether an induction loop system is present. It is to be appreciated, that the traffic sensor detecting systems in accordance with the present disclosure can be configured to detect a wide array of traffic sensor types.

As is to be appreciated, the traffic sensor detecting systems disclosed herein can be an integrated feature of a vehicle that is installed during manufacturing, for example, or an after-market, standalone product that is mounted to the vehicle, for example. With this system, a driver will be able to be informed of the presence and location of induction loops in the nearby vicinity. A detection unit of a traffic sensor detecting system can be mounted proximate to the bottom of a vehicle such that it is close to the road surface. The sensing coil of the detection unit can be orientated such that it is in-plane with the road surface or orthogonal to the road surface, for example. If multiple sensing coils are used, which coil can have the same orientation or a different orientation.

While the vehicle is moving at low speeds (i.e., <30 mph), the traffic sensor detecting system can be active and scanning for induction loop devices. When a loop is detected, the user can be notified via a variety of suitable approaches. The user may also be guided as to the best position the vehicle should be in to trigger the loop operation, typically by centering the vehicle over the center of the loop. For other vehicles, particularly small vehicles, it may be ideal for the vehicle to align over the coil edges instead of the center.

The traffic sensor detecting system can notify the driver of the presence of a traffic sensor through various means, depending on the embodiment. In some embodiments, the information is transmitted through the vehicle's CAN bus and displayed on the in-dash infotainment system. This can allow for seamless integration with the vehicle's existing user interface, providing the driver with navigational guidance related to detected traffic sensors. Such navigational guidance can be visual-based guidance on a graphical interface of the vehicle, haptic guidance (vibration of steering wheel and/or seat), audio guidance (such as beeps or tones emitted through speakers of the vehicle) or combinations thereof.

Alternatively, a separate base station unit can be mounted within the vehicle's cabin, for example. This base station can be equipped with its own user interface and can receive information from an output unit of a traffic sensor detecting system mounted to the vehicle. Upon receiving data indicating the presence of a traffic sensor, the base station can alert the driver through its user interface. Such data can be received via any suitable communication channel, including wireless channels and wired channels.

In other embodiments, the base station unit acts as an intermediary, wirelessly receiving information from the traffic sensor detecting system and relaying it to the driver's mobile communication device, such as a smartphone or tablet. The mobile device then presents the traffic sensor information to the driver through a dedicated application or other notification system. In other embodiments, the output unit of the traffic sensor detecting system can communicate directly with the driver's mobile communication device, eliminating the need for a base station, for example. This can be achieved through wireless communication protocols like Bluetooth to provide a wireless communication connection between the traffic sensor detecting system and the mobile device.

Although traffic sensor detecting systems in accordance with the present disclosure offer various methods to notify drivers of the presence of a traffic sensor, the applications of these systems extend beyond driver notification. In the case of driverless or autonomous vehicles, the information gathered by the traffic sensor detecting system can be utilized for vehicle guidance. When a traffic sensor detecting system is integrated into an autonomous vehicle, it may not be necessary or desirable to notify the occupants of the vehicle when a traffic sensor is detected. Instead, the data collected by the traffic sensor detecting system can be directly transmitted to the vehicle's guidance system. This allows the autonomous vehicle to process the information and automatically maneuver the vehicle proximate to the detected traffic sensor. Thus, the vehicle guidance system, which is responsible for controlling the autonomous vehicle's movement and decision-making, can leverage the real-time data provided by the traffic sensor detecting system to optimize the vehicle's path of travel to ensure activation of the associated traffic control device. Moreover, the data collected by the traffic sensor detecting system can be used to update the autonomous vehicle's mapping and navigation databases.

In addition to benefiting individual drivers and autonomous vehicles, traffic sensor detecting systems in accordance with the present disclosure can also contribute to the improvement of third-party mapping services. By sharing relevant information with various platforms such as Google® Maps, Apple® Maps, and Waze®, or other GIS mapping systems, for example, traffic sensor detecting systems can help create more accurate and up-to-date maps. When a traffic sensor detecting system identifies a traffic sensor, the location of the traffic sensor can be transmitted to one or more mapping services through secure communication channels. The mapping services can then process and integrate this information into their existing maps, marking the presence of the traffic sensor. Such maps can then be utilized by both drivers and by autonomous vehicles.

Figure 2:
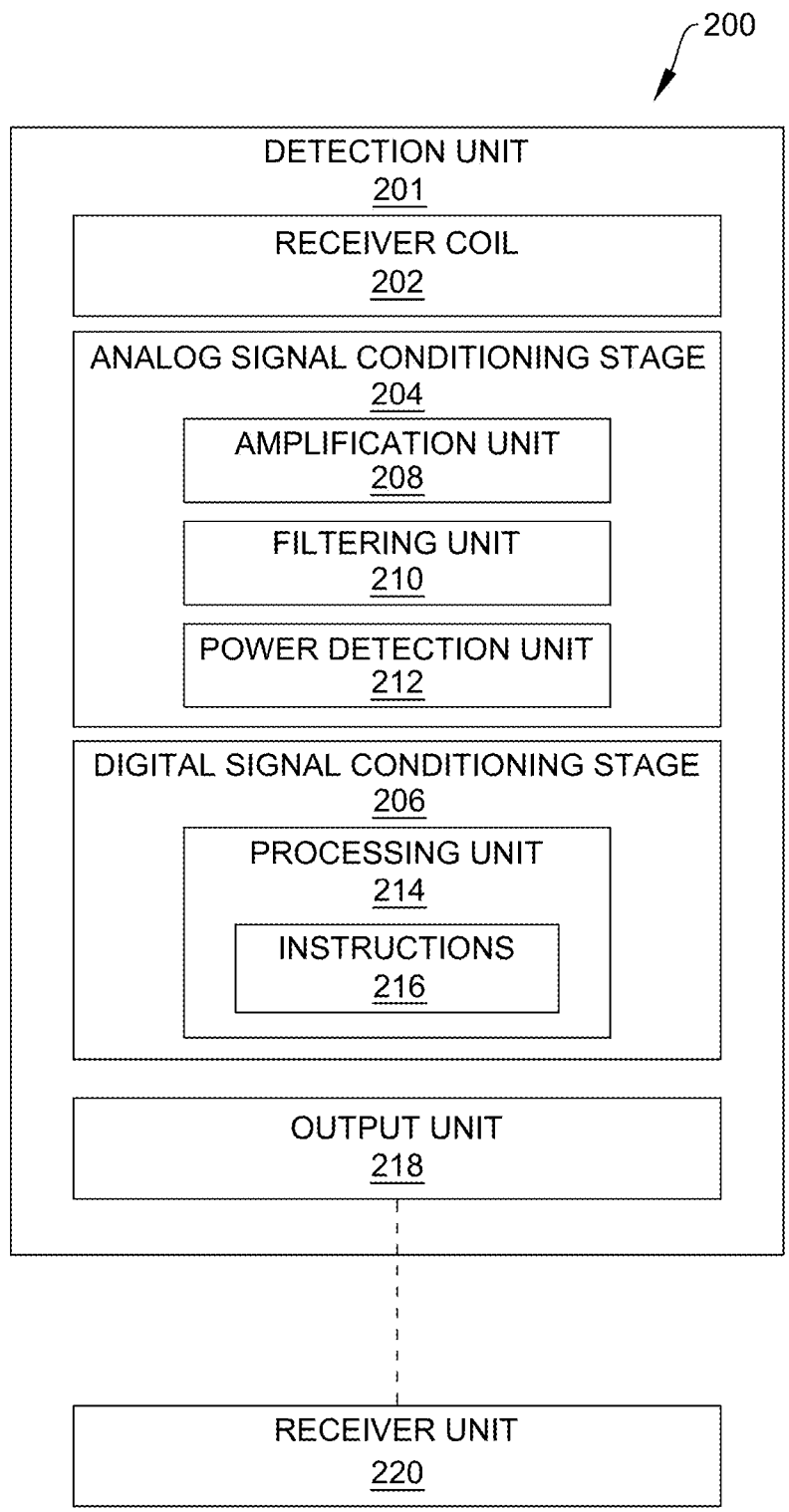
FIG. 2 is a block diagram of an example traffic sensor detecting system in accordance with one non-limiting embodiment.

Referring now to FIG. 2, a block diagram of an example traffic sensor detecting system 200 is illustrated. The traffic sensor detecting system 200 can generally include a detection unit 201 that can be coupled or otherwise incorporated into an undersurface of a vehicle. As described in more detail below, the detection unit 201 can be in communication with a receiver unit 220. In accordance with the present disclosure, the detection unit 201 can include a receiver coil 202, an analog signal conditioning stage 204, and a digital signal conditioning stage 206.

The receiver coil 202 can comprise a multi-turn loop of wire around an air-core or ferrite core. Due to Faraday's law, the receiver coil 202 will create a voltage in the presence of a changing magnetic field that has field lines that are perpendicular to the plane of the coil. The magnitude of the voltage generated by the receiver coil 202 is determined by the magnetic field strength, the number of turns, and the area of the coil. Thus, the number of turns and area of the receiver coil 202 can be modified to meet design requirements on cost, size, and sensitivity of the traffic sensor detecting system 200. One example receiver coil 202 is a rectangular coil that is about 4 inches by about 6 inches, with about 25 turns of insulated silver-plated 30AWG copper wire wrapped around a plastic form. The electrical parameters of this example receiver coil 202 are a resistance of 4.3 Ohms and an inductance of 387 microhenry. Based on these electrical parameters, the output voltage of the receiver coil 202 when held above an example induction loop traffic control device is between 60 millivolts and 430 millivolts and varies based on the distance to the underground wire.

The analog signal conditioning stage 204 can comprise, for example, integrated circuits, resistors, capacitors and inductors that are installed on a printed circuit board of the traffic sensor detecting system 200. The analog signal conditioning stage 204 can filter the voltage signal coming from the receiver coil 202 into a quantity that is digitizable. Three responsibilities of the analog signal conditioning stage 204 can generally include amplification, filtering, and power detection.

Amplification of the signal from the receiver coil 202 by an amplification unit 208 can be necessary because the coil has very low current supplying capabilities. Thus, it can be unsuitable to connect the receiver coil 202 directly to an analog-to-digital converter, as the desired signal would be severely attenuated due to the low impedance. Therefore, an amplifier/buffer of the analog signal conditioning stage 204 can be used to generate a high input impendence. One example of such a circuit uses an operational amplifier having junction field-effect-transistor (JFET) inputs and is utilized in a non-inverting amplifier configuration. Such amplifier devices can present very high input impedances that do not attenuate sensitive sensor signals. The gain of this amplifier can be adjusted based on the expected full-scale range requirements of the output.

Bandpass filtering of the signal by a filtering unit 210 can be required to isolate the signal of interest from other signals that might be superimposed on the voltage signal of the receiver coil 202. Nuisance signals might come from sources like radio frequency transmission and 50 Hz or 60 Hz electrical transmission voltages. A filter of the analog signal conditioning stage 204 can be an active filter utilizing operation amplifier components, or a passive filter utilizing only resistors, capacitors, and inductors. The filter frequency ranges can be fixed (e.g., from 20 KHz-120 KHz) to capture the traffic sensor frequencies that need to be detected. Otherwise, in other embodiments, the filter's frequency could be adjustable and changed dynamically as different detector frequencies are observed.

A power detection unit 212 of the analog signal conditioning stage 204 can measure the power level of the frequencies of interest. Power level measurement can be performed using an envelope detection circuit or by using special purpose integrated circuits, such as the LM567, for example. The output of power detection unit 212 can be a low-frequency signal representing the amount of power present at given frequencies, which can be converted into the digital domain via an analog to digital converter.

In some embodiments, the amplification, filtering, and power detection responsibilities of the analog signal conditioning stage 204 can be developed as separate stages in pipeline, or one circuit element might accomplish two or three simultaneously. For example, an input buffer of the analog signal conditioning stage 204 might also perform bandpass filtering. In some embodiments, the bandpass filtering and envelope detection can be duplicated multiple times using different smaller frequency ranges in a filter cascade architecture. This approach can be used instead of utilizing a single circuit that monitors a large frequency range, for example. Furthermore, another example embodiment implements only an input buffer in the analog domain, then immediately converts that signal to digital. Then digital signal processing can be used to do frequency filtering and detect the power level.

The digital signal conditioning stage 206 of the example traffic sensor detecting system 200 can be implemented on an embedded processing unit 214 containing computer instructions 216. The computer instructions can be responsible, for example, for estimating the presence and location of the induction loop coil according to the application requirements. The algorithm to estimate these, given the energy levels detected by the analog signal conditioning stage 204, could be using a multi-point calibration process using curve-fitting to a linear, quadratic, or exponential system, for example. Alternatively, it could be formulated as a machine learning problem to use techniques like linear regression, decision trees, and so forth. The computation could take other information into account such as accelerometer readings, vehicle speed, and GPS location to make its detection decision. The results of the computation can be communicated to other computing components, shown as a receiver unit 220, by any suitable manner of wireless or wired communication via an output unit 218.

Figure 3:
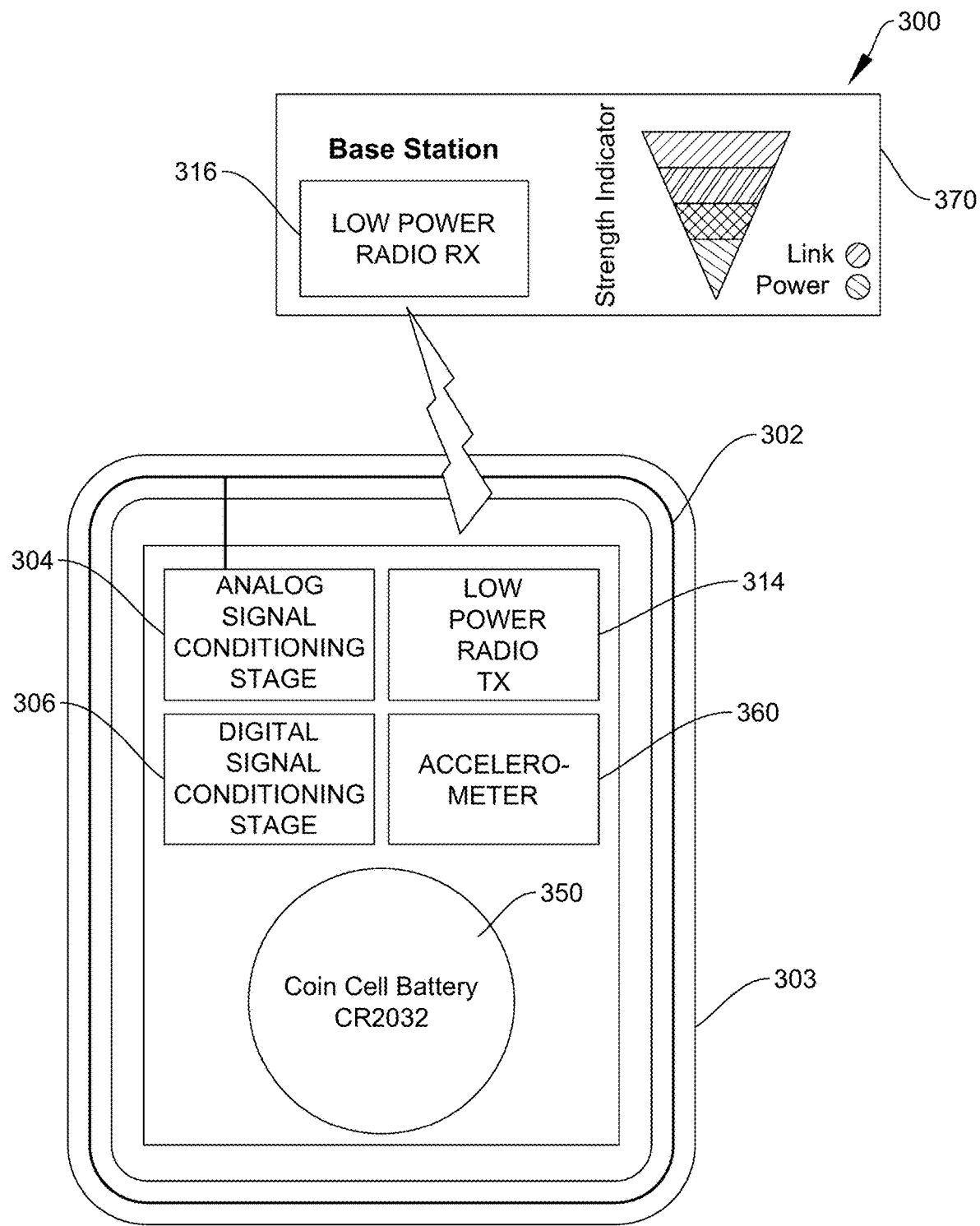
FIG. 3 depicts an example traffic sensor detecting system in accordance with one non-limiting embodiment.

FIG. 3 depicts another traffic sensor detecting system 300 in accordance with one non-limiting embodiment. A detection unit 301 includes a weatherproof housing 303 that can be coupled to a suitable location on a vehicle. The detection unit 301 of FIG. 3 is powered by a battery 350, which can be a CR2032 coin cell, for example. Similar to the detection unit 201 described above, the detection unit 301 includes a receiver coil 302 that detects changes in the magnetic field caused by the presence of a traffic sensor. The signal from the receiver coil 302 is then processed by an analog signal conditioning stage 304, which filters and amplifies the signal to improve its quality. The conditioned analog signal is then converted to a digital signal by a digital signal conditioning stage 306, which may include an analog-to-digital converter and digital signal processing techniques to further enhance the signal and extract relevant features, as described above.

To conserve power, the traffic sensor detecting system 300 shown in FIG. 3 incorporates an accelerometer 360 that detects when the vehicle is moving. The system 300 can intelligently shut down the analog signal conditioning stage 304 during stationary periods, when the vehicle is moving quickly, or based on other operational conditions determined by the accelerometer data. This power-saving mechanism enables the battery 350 to power the device for a year or more.

Once the traffic sensor detecting system 300 has processed the signal and determined the presence of a traffic sensor, it can communicate this information, for example, to a base-station device 370 using a low-power radio transmitter 314. The base-station device 370 illustrated in FIG. 3 can be equipped with a corresponding low-power radio receiver 316 to receive the traffic sensor data from the detecting system. The base-station device 370 can then provide navigational information to a driver of the vehicle to aid the driver in maneuvering the vehicle relative to the detected traffic sensor.

Figure 4:
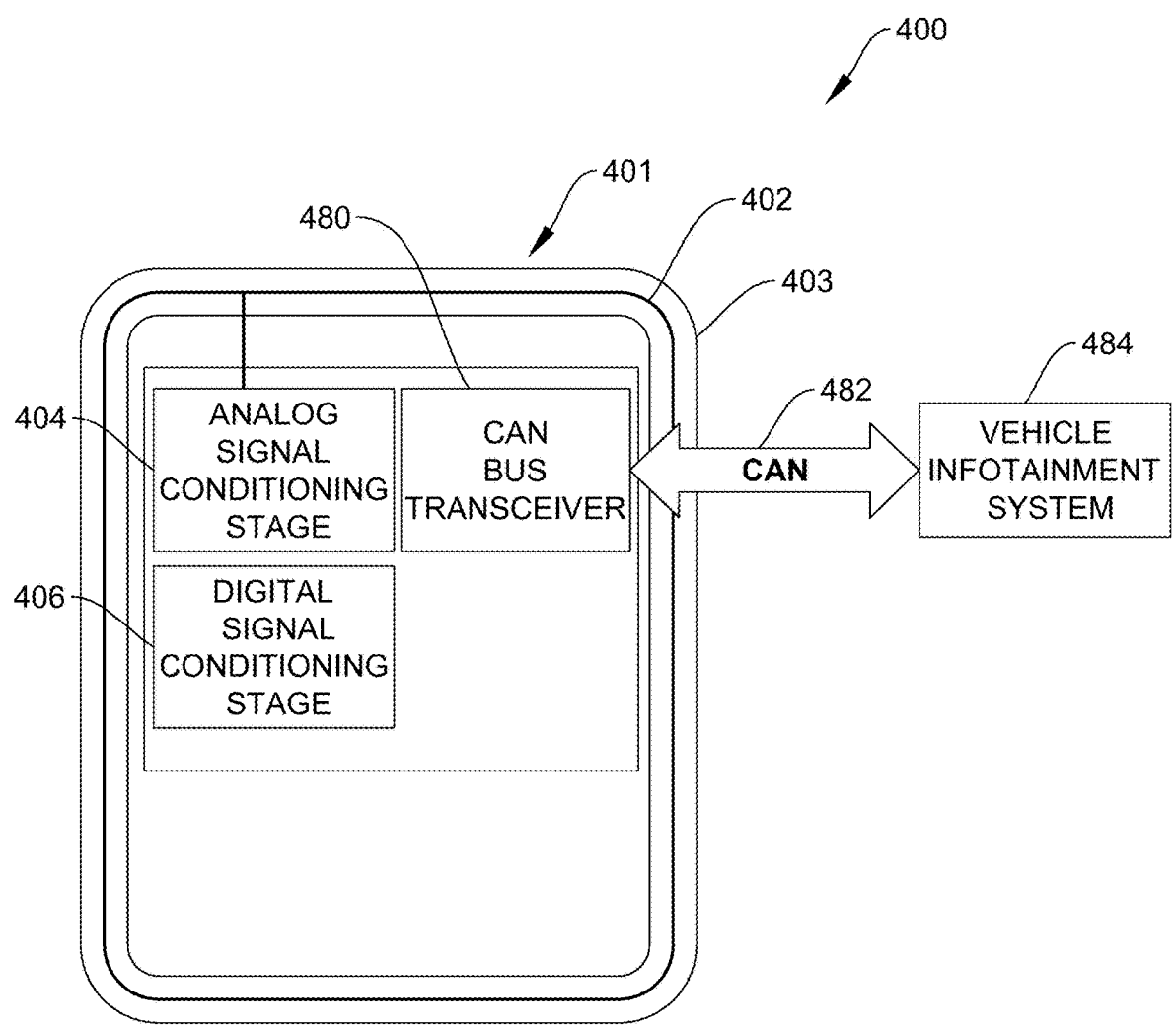
FIG. 4 depicts another example traffic sensor detecting system in accordance with one non-limiting embodiment.

In accordance with another example embodiment, and as depicted in FIG. 4, a detection unit 401 of a traffic sensor detecting system 400 can include a Controller Area Network (CAN) bus transceiver 480 that enables communication over a vehicle's CAN bus 482. Similar to the embodiment in FIG. 3, the detection unit 401 in FIG. 4 can include a receiver coil 402, an analog signal conditioning stage 404, and a digital signal conditioning stage 406 positioned within a housing 403, which can collectively detect and process the signals indicating the presence of traffic sensor.

The CAN bus 482 is a vehicle bus standard designed to allow microcontrollers and devices to communicate with each other's applications without a host computer using a message-based protocol. The CAN bus transceiver 480 can allow the detection unit 401 to send traffic sensor data directly to the vehicle's infotainment system 484, for example, which can serve as a user interface for presenting information to the driver. As such, the infotainment system 484 can display information to provide real-time information to the driver regarding the presence of a detected traffic sensor. To communicate over the CAN bus 482, the detection unit 401 can adhere to the CAN protocol. As such, the traffic sensor data can be packaged into CAN frames, which include an ID (identifier) field, a DLC (data length code) field, and a data field. The ID field determines the priority of the message thereby allowing interoperability with other devices on the network, while the DLC field indicates the size of the data field. The detection unit 401 can be assigned a specific ID range for its messages, ensuring that they are properly recognized and processed by the infotainment system 484. Alternatively, or additionally, other communication interfaces such as Local Interconnect Network (LIN) or Ethernet could be used, depending on the vehicle's architecture and the requirements of the traffic sensor detecting system.

Figure 5:
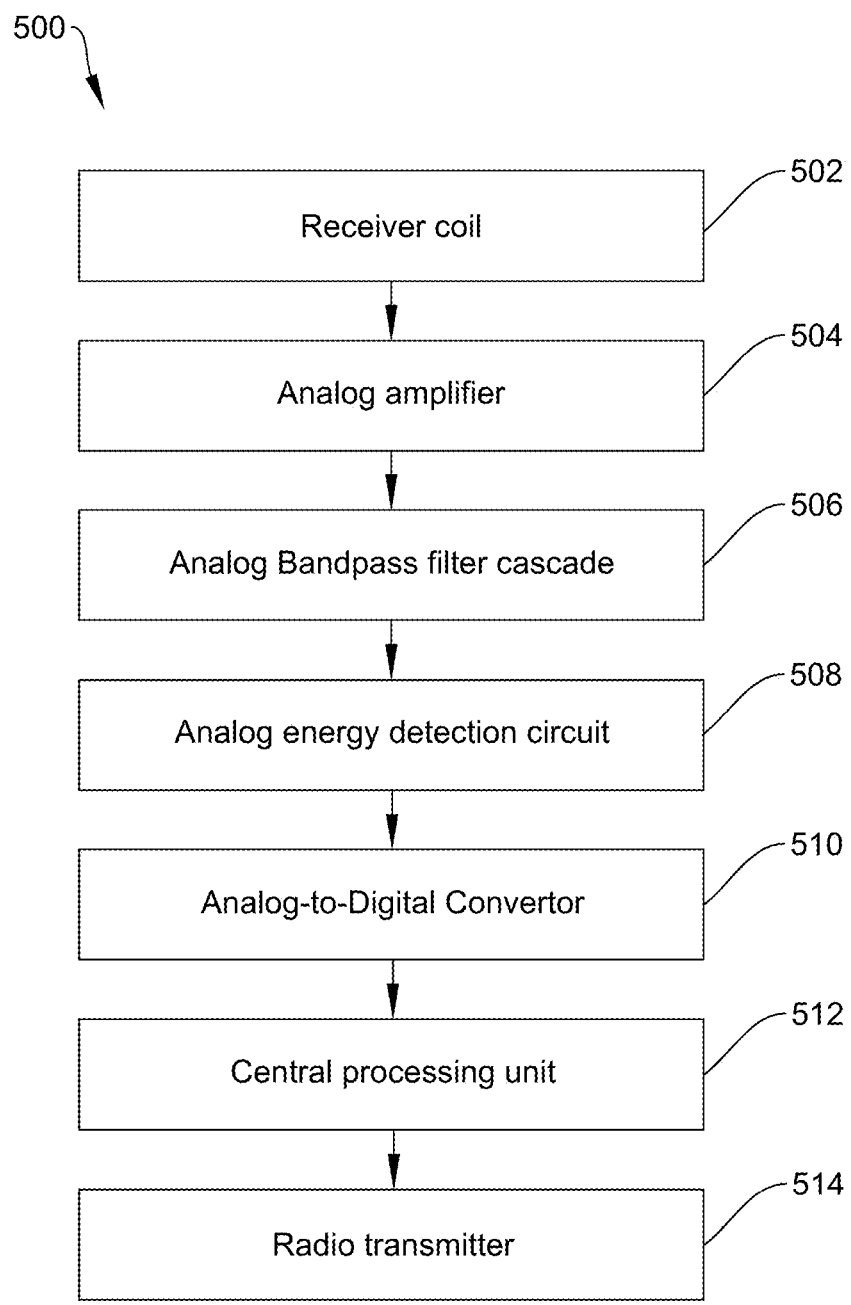
FIG. 5 illustrates a signal processing flow for an example traffic sensor detection system in accordance with one non-limiting embodiment.

FIG. 5 illustrates a signal processing flow 500 for an example traffic sensor detection system. The process begins at step 502, where a receiver coil generates a voltage in response to a changing magnetic field caused by the presence of a traffic sensor. As the voltage signal is generated, it is sent to an analog amplifier at step 504. The amplifier boosts the signal strength, making it more suitable for subsequent processing stages. After amplification, the signal undergoes bandpass filtering at step 506. The bandpass filter is designed to isolate the specific frequencies of interest that are associated with a traffic sensor signature. By removing noise and other unwanted frequency components, the bandpass filter enhances the signal-to-noise ratio, making the traffic sensor signal more prominent and easier to detect. At step 508, the power level of the filtered frequencies of interest is measured. This power measurement provides a quantitative assessment of the strength of the traffic sensor signal. The power measurements are then converted into the digital domain at step 510. This analog-to-digital conversion process allows the signal to be processed by a microcontroller or digital signal processor, for example. The digital representation of the power measurements can enable, for example, more advanced signal analysis and decision-making algorithms to be applied. Once in the digital domain, the power measurements are analyzed, and the central processing unit generates appropriate output signals at step 512. The central processing unit may implement various algorithms and threshold-based decision-making processes to determine the presence and location of a traffic sensor based on the digital power measurements. Finally, at step 514, the output signals generated by the central processing unit are transmitted to a receiver unit using a suitable communication method. This can be achieved through a radio transmitter, which sends the central processing unit detection data wirelessly to a nearby receiver device. Alternatively, other communication methods, such as wired connections or other communication links, can be utilized. The receiver unit, which can be a standalone device, a vehicle's infotainment system, or a mobile device, for example, can receive the transmitted central processing unit data. It can then process this information further, display it to the user, or relay it to other systems for appropriate action, such as alerting the driver or providing actuation of an autonomous vehicle.

Figure 6A:
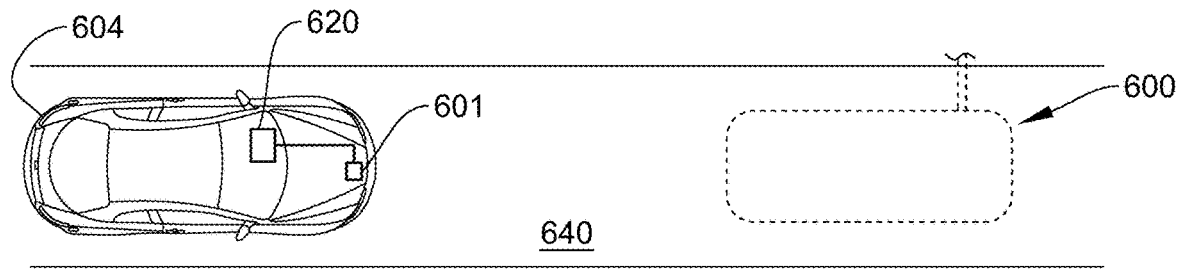
FIGS. 6A-6C depict the progression of a vehicle approaching a traffic sensor that is embedded in a roadway in accordance with one non-limiting embodiment.
Figure 6B:
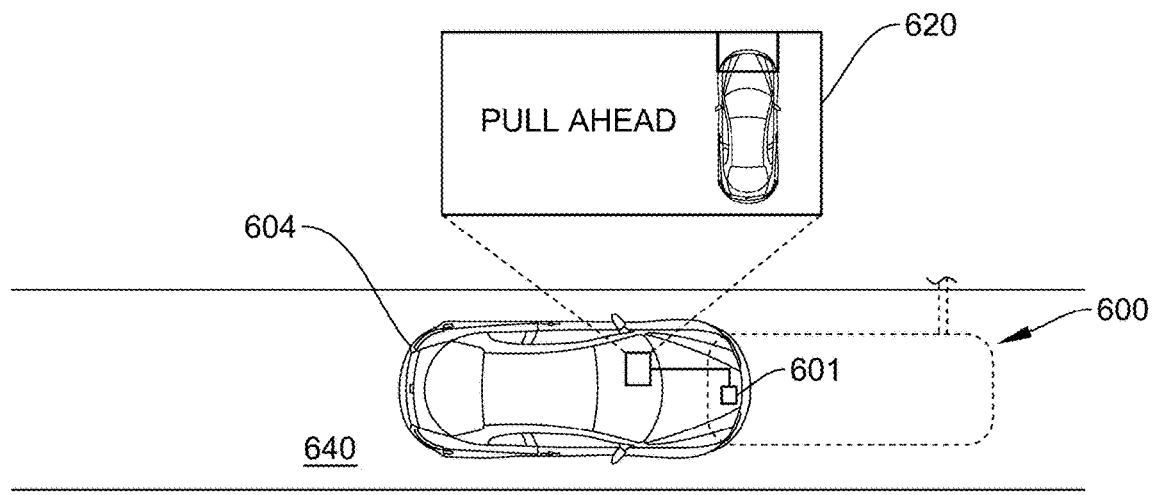
Figure 6C:
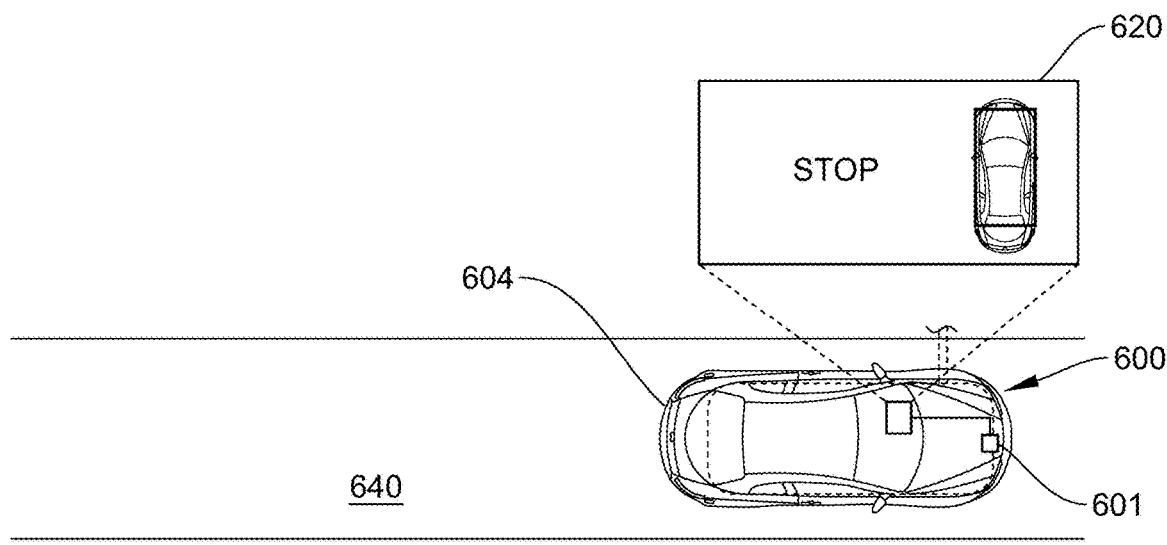

FIGS. 6A-6C illustrate the sequence of a vehicle 604 approaching and driving over a traffic sensor 600 embedded in a roadway 640. The vehicle 604 is equipped with a detection unit 601, which is shown positioned on the underside of the front bumper. Inside the cabin of the vehicle 604, a receiver unit 620 with a graphical display is positioned to provide the driver with real-time information about the detected traffic sensor 600. It is to be appreciated, however, that the content and format of the graphical display shown in FIGS. 6A-6C are for illustrative purposes only and may vary in various implementations.

In FIG. 6A, the vehicle 604 is approaching the traffic sensor 600, but the detection unit 601 has not yet detected the presence of the traffic sensor 600. Namely, the magnetic field generated by the traffic sensor 600 is not strong enough to trigger a response in the detection unit 601. As the vehicle 604 continues to move forward and drives over a portion of the traffic sensor 600, as depicted in FIG. 6B, the detection unit 601 generates a voltage in response to the changing magnetic field caused by the presence of the traffic sensor 600. This voltage signal is then processed and the signal is transmitted to the receiver unit 620 inside the vehicle's cabin. The receiver unit 620 provides information to the driver through its graphical display about the detected traffic sensor 600. In this example embodiment, the display presents a bird's eye view of the vehicle 604 and visualization of the detected traffic sensor 600 relative to the vehicle, along with operational instructions for the driver. The visual representation helps the driver understand their position relative to the traffic sensor 600 and guides them on how to proceed. FIG. 6C shows the vehicle 604 centered directly over the traffic sensor 600. At this point, the detection unit 601 continues to generate a voltage due to the strong magnetic field produced by the traffic sensor 600. The receiver unit 620 updates its display accordingly, indicating that the vehicle 604 is now fully positioned over the traffic sensor 600. In this example embodiment, the bird's eye view on the receiver unit 620 can illustrate the alignment between the vehicle 604 and the traffic sensor 600, providing visual confirmation to the driver. Additionally, the operational instructions on the display advise the driver to stop the vehicle, ensuring that the vehicle 604 remains in the optimal position for the traffic sensor 600 to perform its intended function. Furthermore, the graphical display on the receiver unit 620 can be customized to present information in various formats, such as text, icons, or color-coded indicators, depending on the specific requirements and preferences of the system.

In one implementation, multiple receiver coils with multiple signal chains and advanced digital algorithms implemented by the digital signal conditioning stage can be used to take differential measurements of the magnetic field strength between the multiple receiver coils. This approach can beneficially enhance the location-finding capability of the traffic sensor detecting system, as it can observe the gradient of field strength instead of just a point measurement, thereby providing improved detection granularity. In some embodiments, three coils can be arranged in a triangular orientation within a housing of a detection unit. In other embodiments, two coils can be positioned side-by-side, for example. In some embodiments, multiple sensors can be positioned in different enclosures that are positioned at various locations on the vehicle. For instance, in some embodiments, sensors can be integrated in both the front and rear bumpers.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended that the scope of the invention is to be defined by the claims appended hereto.

We claim:

1. A traffic sensor detection system for detecting induction loop traffic sensors, comprising:
   a sensor housing configured to be mounted to a vehicle, the sensor housing containing a receiver coil, wherein the receiver coil generates a voltage signal responsive to detecting a magnetic field emanating from an induction loop embedded in a roadway;
   an amplifier circuit that receives the voltage signal and generates an analog output;
   a bandpass filter that filters the analog output to isolate a frequency range of 20-120 KHz corresponding to operational frequencies of existing induction loop traffic sensors to generate a filtered signal;
   a power detection circuit that measures a power level of the filtered signal;
   an analog-to-digital converter that receives the power level measurements and generates a digital output;
   a microprocessor that processes the digital output to determine a location of the induction loop relative to the sensor housing and generates an output signal indicating positioning information for the vehicle relative to the detected induction loop;
   a transmitter that transmits the output signal indicating the determined location of the induction loop; and
   a receiver device in communication with the transmitter, wherein the receiver device receives the output signal and provides navigational guidance to assist a driver in positioning the vehicle over the detected induction loop.

2. The traffic sensor detection system of claim 1, wherein the output signal identifies the presence of an induction loop proximate to the sensor housing.

3. The traffic sensor detection system of claim 1, wherein the output signal is transmitted to the receiver device over a wired communication network.

4. The traffic sensor detection system of claim 1, wherein the output signal is transmitted to the receiver device over a wireless communication network.

5. The traffic sensor detection system of claim 1, wherein the transmitter comprises a Controller Area Network (CAN) bus transceiver.

6. The traffic sensor detection system of claim 5, wherein the output signal is transmitted to the receiver device over a CAN bus by the CAN bus transceiver.

7. The traffic sensor detection system of claim 1, wherein the receiver device is a base station.

8. The traffic sensor detection system of claim 1, wherein the receiver device is a mobile communications device.

9. The traffic sensor detection system of claim 1, wherein the receiver device is a vehicle infotainment system.

10. The traffic sensor detection system of claim 1, wherein the sensor housing comprises a battery.

11. The traffic sensor detection system of claim 1, wherein the sensor housing comprises an accelerometer.

12. The traffic sensor detection system of claim 1, wherein the sensor housing is weatherproof.

13. The traffic sensor detection system of claim 1, wherein the receiver device is associated with an autonomous vehicle.

14. The traffic sensor detection system of claim 1, wherein the receiver device is associated with a GIS mapping system.

15. A traffic sensor detection system for detecting induction loop traffic sensors, comprising:
 a receiving device;
 a sensor housing configured to be mounted to a vehicle, the sensor housing comprising a receiver coil, wherein the receiver coil generates a voltage signal responsive to detecting a magnetic field emanating from an induction loop traffic sensor;
 an amplifier circuit that receives the voltage signal and generates an analog output;
 a power detection circuit that measures a power level of the analog output;
 an analog-to-digital converter that receives the power level measurements and generates a digital output; and
 a microprocessor and a Controller Area Network (CAN) bus transceiver, wherein the microprocessor processes the digital output to determine positioning information relative to the detected induction loop traffic sensor and transmits an output signal via the Controller Area Network (CAN) bus transceiver over a CAN bus to the receiver device.

16. The traffic sensor detection system of claim 15, wherein the receiver device is a vehicle infotainment system.

17. A method of detecting an induction loop traffic sensor embedded in a roadway, comprising:
 mounting a receiver coil to a vehicle;
 generating with the receiver coil a voltage in response to detecting a changing magnetic field emanating from an induction loop traffic sensor as the vehicle approaches the traffic sensor, wherein the traffic sensor comprises an induction loop used for traffic control;
 amplifying the voltage with an analog amplifier to generate an amplified signal;
 filtering the amplified signal with a bandpass filter to isolate a frequency range of 20-120 KHz corresponding to operational frequencies of existing induction loop traffic sensors to generate a filtered signal;
 measuring a power level of the filtered signal;
 converting the power level measurements to a digital signal; and
 processing the digital signal to generate an output signal indicative of positioning information for optimal vehicle placement relative to the vehicle detected traffic sensor.

18. The method of claim 17, further comprising:
 presenting navigational information for the vehicle based on the location of the traffic sensor relative to the vehicle.

19. The method of claim 18, wherein presenting navigational information for the vehicle comprises graphically presenting navigation information on any of a base station, a mobile communications device, and an infotainment system of the vehicle.

20. The method of claim 17, further comprising:
 providing navigational information to a GIS mapping system.

* * * * *